Sept. 2, 1924.　　　　　　　　　　　　　　　　　　　　　1,507,495
H. W. LUSTIG
MEASURING AND DISPENSING APPARATUS
Filed Jan. 17, 1923　　　　　5 Sheets-Sheet 1
Fig. 1.
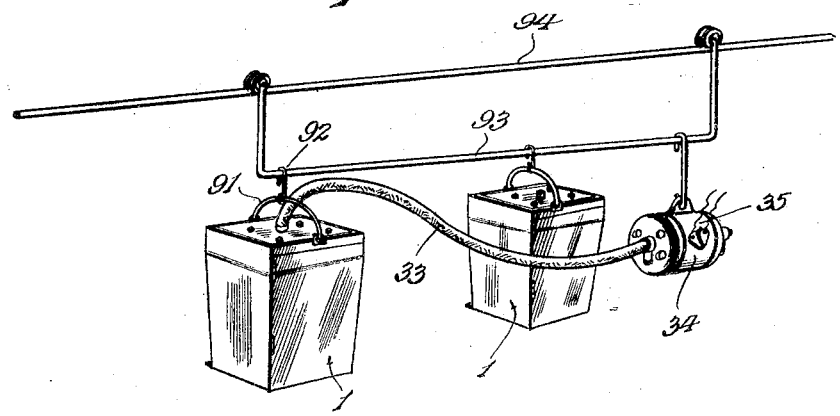
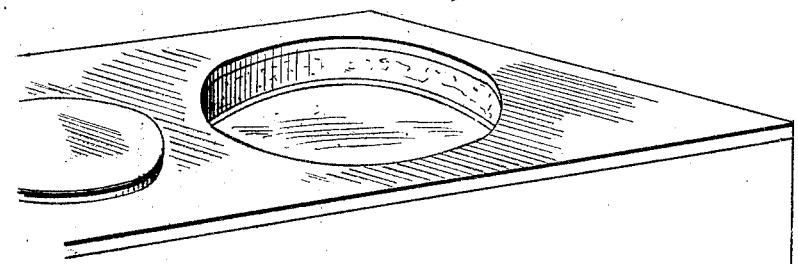
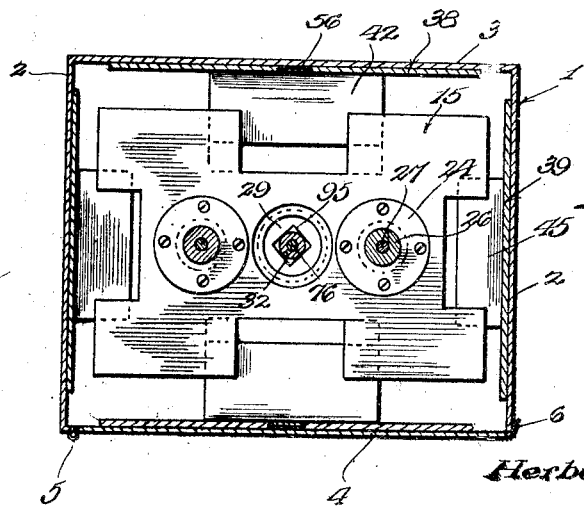
Fig. 6.
Inventor
Herbert W. Lustig.
By
Lacey & Lacey, Attorneys

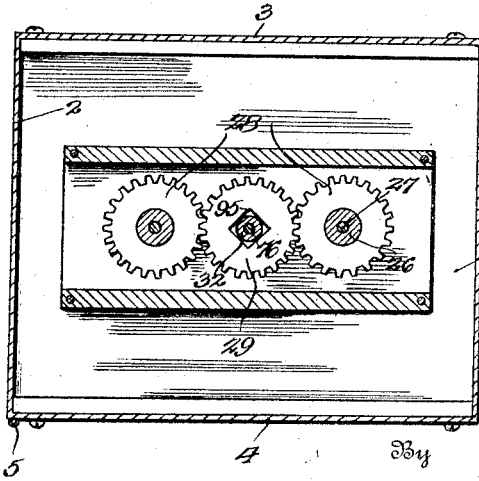

Sept. 2, 1924.

H. W. LUSTIG 1,507,495

MEASURING AND DISPENSING APPARATUS

Filed Jan. 17, 1923   5 Sheets-Sheet 3

Inventor

Herbert W. Lustig.

By Lacey & Lacey, Attorneys

Sept. 2, 1924.

H. W. LUSTIG

MEASURING AND DISPENSING APPARATUS

Filed Jan. 17, 1923

Inventor
Herbert W. Lustig.
By
Lacey Lacey, Attorneys

Sept. 2, 1924.
H. W. LUSTIG
1,507,495
MEASURING AND DISPENSING APPARATUS
Filed Jan. 17, 1923   5 Sheets-Sheet 5
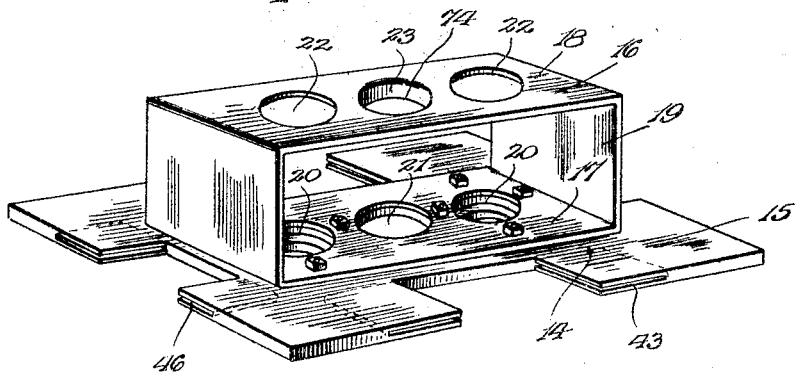
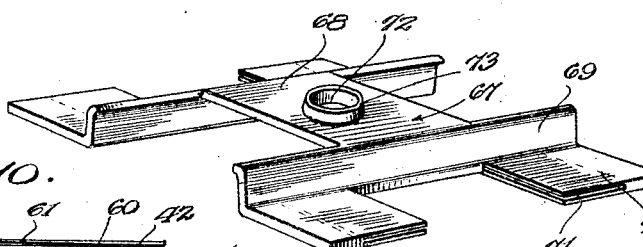
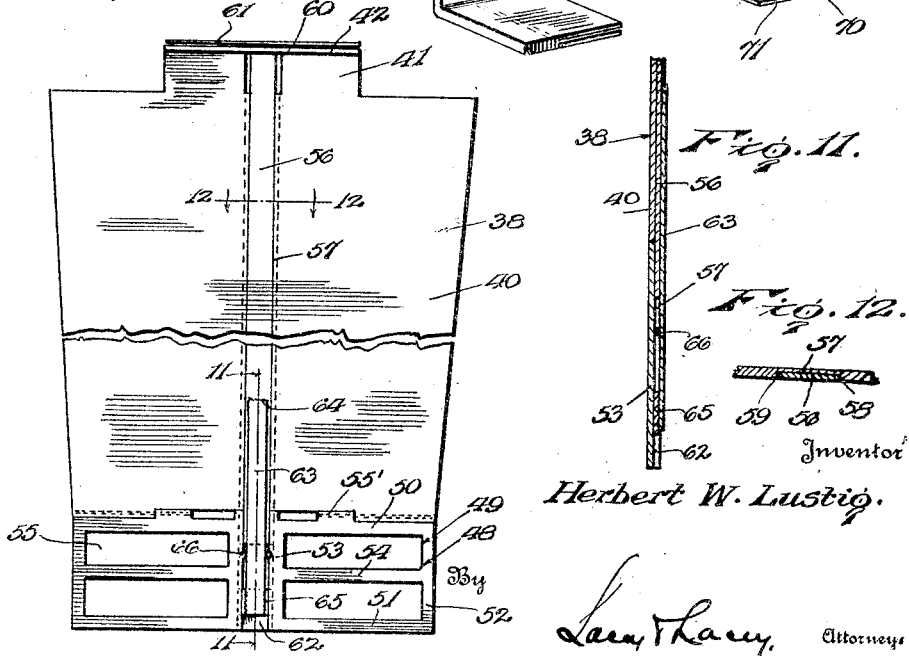
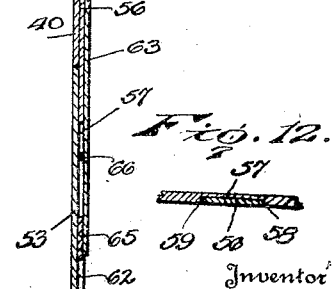
Inventor
Herbert W. Lustig.
By
Lacey & Lacey, Attorneys Patented Sept. 2, 1924.

1,507,495

UNITED STATES PATENT OFFICE.

HERBERT W. LUSTIG, OF YOUNGSTOWN, OHIO, ASSIGNOR TO JOSEPH J. LUSTIG, OF SARANAC LAKE, NEW YORK.

MEASURING AND DISPENSING APPARATUS.

Application filed January 17, 1923. Serial No. 613,196.

*To all whom it may concern:*

Be it known that I, HERBERT W. LUSTIG, a citizen of the United States, residing at Youngstown, in the county of Mahoning and State of Ohio, have invented certain new and useful Improvements in Measuring and Dispensing Apparatus, of which the following is a specification.

This invention relates to an apparatus for cutting, shaping, and measuring commodities to be dispensed in bulk in card board or similar containers and while the apparatus is designed primarily for use in dispensing ice cream in bulk, the principles of the invention are not limited to this embodiment.

Confectioners, druggists, grocers, and others who dispense ice cream in bulk in measured quantities, experience considerable inconvenience in filling the card board cartons into which the cream is packed. The ice cream is delivered to the dealers, usually in five gallon cans, and when delivered is firmly packed. In dispensing the commodity an honest dealer will pack the card board carton, by the use of a flattened spoon, with substantially the same degree of compactness as that in which the commodity was delivered to him, and will frequently even more firmly pack the cream, thus giving to the purchaser a greater quantity than contemplated. An unscrupulous dealer will loosely pack the commodity in the carton and deliver to the customer a less quantity than paid for. In any event this method of filling the dispensing cartons is a slow, laborious, and tedious one, and is in every way unsatisfactory. The present invention, therefore, has as its primary object to provide an apparatus by the use of which ice cream and similar commodities may be dispensed in bulk in measured quantities in a more convenient, more expeditious, and more satisfactory way than by the present method.

Another important object of the invention is to provide an apparatus by the use of which a measured volume of the commodity to be dispensed may be extracted from a container for the commodity in a form or shape adapting it to be delivered directly into the card board carton in which it is to be dispensed and exactly fill said carton thus insuring of delivery to the purchaser of the precise quantity of the commodity asked and paid for.

More specifically, the invention contemplates the provision of an apparatus for the purpose stated embodying means operable to cut into and remove from a mass of a commodity to be dispensed, such as ice cream, a block of the commodity of the precise form and dimensions to fit snugly within and completely fill a dispensing receptacle, such as a card board carton, in which the commodity is to be delivered to the purchaser, so that the dispenser of the commodity will be relieved of the time-consuming labor incident to filling the dispensing receptacle in the usual manner.

Another important object of the invention is, specifically, to provide in an apparatus for the purpose stated, a novel arrangement of blades, and means for guiding and moving the blades in a manner to cause them to enter the ice cream or other commodity in a direction and to an extent to define and border by the incisions made by them a block of the commodity of the required form and dimensions. In this connection the invention also has as one of its objects to provide in connection with the blades, means for defining the bottom of the block and retaining the block within the temporary housing or container afforded by the assemblage of blades so that the block of ice cream thus formed may be removed from the mass of the commodity and then delivered into the card board carton or the like in which it is to be dispensed.

Another object of the invention is to so construct the apparatus that before its use it will only be required for the operator to dispose and hold the apparatus upon the surface of the mass of ice cream or the like from which a block is to be removed, the blade moving means and the various devices associated therewith being motor operated and requiring practically no attention on the part of the dispenser of the commodity.

In the accompanying drawings:

Figure 1 is a perspective view illustrating the arrangement of the apparatus embodying the invention;

Figure 2 is a detail vertical transverse sectional view through the apparatus, the blades thereof being retracted;

Figure 5 is a horizontal sectional view on the line 5—5 of Figure 2 looking in the direction indicated by the arrows;

Figure 6 is a similar view on the line 6—6 of Figure 2;

Figure 8 is a perspective view of the supporting head for the blades;

Figure 9 is a perspective view of the actuating head for the bottom-forming members;

Figure 10 is a view in side elevation of one of the blades;

Figure 11 is a detail vertical sectional view on the line 11—11 of Figure 10 looking in the direction indicated by the arrows;

Figure 12 is a detail horizontal sectional view on the line 12—12 of Figure 10.

Figure 3:
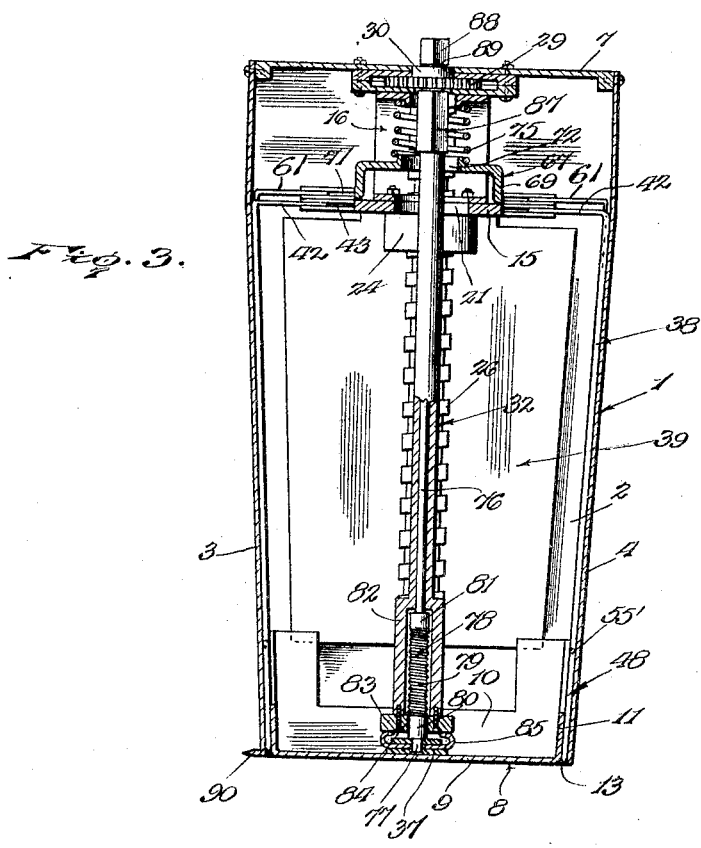
Figure 3 is a vertical sectional view on the line 3—3 of Figure 2 looking in the direction indicated by the arrows and with the blades in the position stated.
Figure 7:
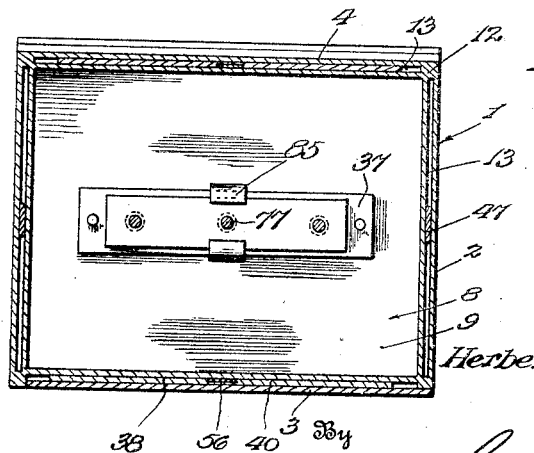
Figure 7 is a similar view on the line 7—7 of Figure 2 looking in the direction indicated by the arrows.
Figure 4:
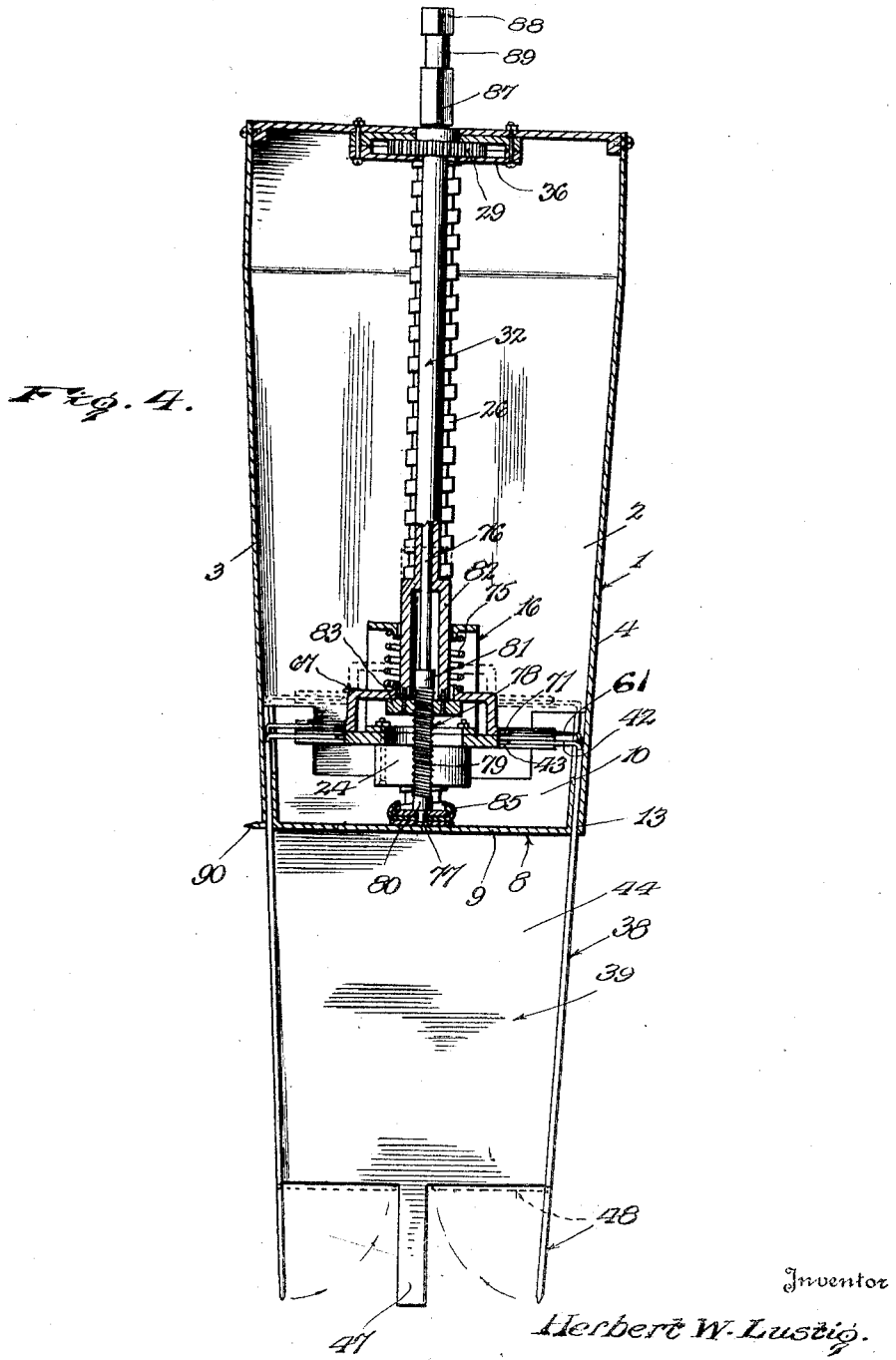
Figure 4 is a view similar to Figure 3 illustrating the blades projected, the bottom-forming members of the blades being shown in full lines in their initial position and in dotted lines in the position which they will assume when the bottom of the block of ice cream has been formed.

The apparatus embodying the invention comprises a casing within which the mechanism is housed and which is indicated in general by the numeral 1. The said casing comprises side walls 2, a back wall 3, and a front wall 4, which latter is preferably hinged at one side, as at 5, to one of the walls 2, any suitable type of latch 6 being provided at the free side of the door thus provided, for holding the same closed. By providing the casing with the hinged front 4, access may be readily had to the interior of the casing for repairing the mechanism housed therein. The top of the casing is closed by a plate 7 secured in place in any suitable manner. The bottom of the casing is closed by a member indicated in general by the numeral 8 and comprising a plate 9 having upstanding sides 10 and ends 11. The bottom member 8 is provided with projecting corner portions 12 which are secured in any suitable manner within the corners between the walls of the casing body so that the sides and ends of the said bottom member 8 are slightly spaced from the inner faces of the corresponding walls of the casing to provide throats 13 through which the blades of the apparatus may be projected and retracted. At this point it will be observed that the walls 2 are inclined downwardly toward each other, as shown in Figure 2, and that the rear and front walls 3 and 4 of the casing are similarly inclined, as shown in Figures 3 and 4, so that so far as general form is concerned the casing of the apparatus is a substantial counterpart of the body of the usual card board ice cream carton.

The blades of the apparatus, to be presently specifically described, are supported and actuated through the medium of a supporting head which is most clearly shown in Figure 8 of the drawings and which is indicated in general by the numeral 14. This head 14 comprises a plate 15 upon the upper side of which is mounted and secured a hollow rectangular frame 16 comprising a bottom 17, a top 18, and ends 19. The bottom 17 of the frame and the plate 15 are formed with registering openings 20 and between these openings with an opening 21, and the top 18 of the frame 16 is formed with openings 22 and 23 which are located respectively above and in alinement with the openings 20 and 21. Collars 24 are secured to the under side of the plate 15 and are interiorly formed with preferably coarse square threads 25, the openings in the collars being in alinement with the openings 20 in the said plate 15. The numeral 26 indicates threaded sleeve shafts which are rotatably mounted upon spindles 27 fixed at their upper and lower ends, respectively to the top plate 7 of the casing and the bottom 9 of the member 8. The threaded shafts 26 fit through the collars 24 and extend freely through the openings 20 and 22 in the head 14. It will be understood at this point that upon rotation of the shafts 26 in unison in one direction, the head 14 will be bodily fed in a downward direction within the casing and that upon reverse rotation of the shafts in unison, the head will be moved in an upward direction within the casing. In order that rotation of the shafts may be effected in the manner stated, the said shafts are provided at their upper ends with gears 28 fixed relative to the shafts which mesh with a driving gear 29 having a hub portion 30 rotatably received within an opening 31 formed in the top 7 of the casing. A shaft, indicated in general by the numeral 32, extends through the gear 29 and is adapted to be connected with the gear to rotate the same in a manner and under conditions to be presently explained, this shaft being adapted to be driven, in turn, by a flexible shaft 33 extending from an electric motor 34 which is controlled by an electric switch 35 by which the motor may be set in operation to rotate the shaft 33 in either direction and also by which the operation of the motor may be stopped. The gears 28 and also the gear 29 are preferably housed within a shallow casing 36 secured to the under side of the top plate 7 of the casing 1. The lower ends of the spindles 27 are preferably fixed in a bearing plate 37 secured upon the upper side of the member 9 of the bottom 8 of the casing 1, the lower ends of the threaded shafts 26 resting rotatably upon the said bearing member 37.

The apparatus embodies two pairs of blades, the blades of one pair being indicated in general by the numeral 38 and the blades of the other pair being indicated in general by the numeral 39. Each of the blades 38 comprises a plate 40, the lateral edges of which are converged in a downward direction so that the blade is of gradually decreasing width from its upper to its lower end. The plate 40 is provided at its upper end with a shank 41 having a right angularly projecting lip 42 which is slidably fitted into a slot 43 provided in the plate 15 of the head 14 and designed for its reception. The slots 43 are formed in the opposite longer edges of the said plate 15 and as the lips 42 of the blades 38 are slidable in the slots the blades may have limited movement toward and from each other. Each of the blades 39 likewise comprises a plate which is indicated by the numeral 44 and which is provided at its upper end with a lip 45 slidably fitted in a slot 46 provided for its reception, in the plate 15, the slots 46 being formed in the opposite shorter edges of the said plate. The plates comprising the blades 39 are of gradually decreasing width from their upper to their lower ends, as in the case of the plates 40 comprising the blades 38, and they are somewhat narrower than the said plates 40, the plates 40 and 44 being respectively of dimensions corresponding substantially to those of the wider and narrower sides of the ordinary card board ice cream carton, and the taper of the blade plates likewise corresponding to the taper of the respective walls of such a carton. The lower end portions of the plates are slidably received in and guided through the throats 13 heretofore referred to as will be evident by reference to Figures 2, 3 and 4 of the drawings, and it will now be understood that when the blade supporting head 14 is fed downwardly within the casing 1 through the rotation of the threaded shafts 26, the blades 38 and 39 will be projected from the lower end of the casing 1 through the said throats 13 and, when fully projected, will substantially meet edge to edge so as to form a frusto-pyramidal temporary casing for the block of ice cream which is cut at the time of projection of the blades from the casing of the apparatus into the mass of the commodity. Due to the inward inclination of the walls of the casing 1, the blades 38 and 39 which are seated and guided in their movement, against the inner faces of said walls, will have such movement in the planes of the respective casing walls and it will, therefore, be evident that by supporting the blades through the slidable engagement of the lips 42 and 45 in the slots 43 and 46 in the head 14, such movement of the blades bodily inwardly and outwardly as is necessitated through their sliding movement in inclined planes is compensated for. Each of the blades 39 is provided at its lower end with an extension 47 occupying the plane thereof and serving a purpose to be presently explained, and each blade 38 is provided at its lower end with a bottom-forming and retaining member 48 which is constructed and actuated in a manner and for a purpose which will now be explained.

The bottom-forming and retaining member referred to above, as associated with each of the blades 38, comprises a rectangular body 49 of frame-like structure and preferably comprising upper and lower bars 50 and 51, end members 52, a relatively broad intermediate member 53 extending between the bars 50 and 51, and intermediate bars 54 which extend between the end members 52 and the member 53, open spaces 55 being in this manner provided so that minimum resistance will be offered to movement of the member through the commodity to be dispensed. The bar 50 of the member 48 is hinged, as at 55' to the lower edge of the plate 40 comprising the respective blade 38, and this hinge connection is of such nature that while the member 48 may have swinging movement thereabout in an inward direction as illustrated in Figure 4 of the drawings, outward swinging movement of the member is limited by the abutment of the squared upper edge of the upper bar 50 with the correspondingly formed lower edge of the plate 40, as disclosed in said figure and in Fig. 11. Therefore, when the members 48 of the blades 38 are in the full line position shown in Figure 4 and in a common plane with the respective plates 40, they will be restrained from any outward swinging movement although they are capable of being swung inwardly as shown in dotted lines in said Figure 4. At this point it may be stated that the purpose of the bottom-forming and retaining members 48 is to define the bottom of the block of ice cream or other commodity to be extracted by the use of the apparatus and to retain said block securely within the temporary casing afforded by the blades 38 and 39, and with this end in view means is provided for automatically swinging the members 48 inwardly and upwardly after the blades 38 and 39 have been projected to the fullest extent. The means referred to comprises, in the instance of each of the blades 38 and its associated bottom-forming and retaining member 48, an actuating bar 56 which is slidably mounted in a channel 57 formed in the inner face of the plate 40, the edges of the bar 56 being preferably beveled, as indicated by the numeral 58, and the walls of the channel 57 being under cut, as indicated by the numeral 59, so that the bar will be retained within the channel and suitably guided in its sliding movement. The bar 56 at its upper end extends through an opening 60 formed in the blade 38 at the juncture of the shank 41 and the lip 42, and supports a lip 61 which overlies the lip 42 of the associated blade 38, this lip 61 serving a purpose to be presently explained.

The intermediate portion 53 of the frame comprising the member 48 is likewise formed in its inner face with a vertically extending channel 62 constituting a continuation of the channel 57 when the frame 49 is in the down swung or lowered position and occupies the same plane as the plate 40. The numeral 63 indicates a leaf spring which is permanently secured at its upper end, as at 64, to the bar 56 and which carries at its lower end a head 65 which extends transversely thereof and is provided with beveled ends engaging the under cut walls of the channel 62, the head 65 being in this manner retained within the channel and guided in its sliding movement therein. Upward sliding movement of the head 65 in the channel 62 is limited by indenting or striking down the side walls of the said channel at oppositely located points, as indicated by the numeral 66, these indented portions of the walls constituting stops for the said head 65. The spring 63 constitutes a flexible resilient connection between the actuating bar 56 and the head 65 as will be evident.

The actuating head for the bottom-forming and retaining members 48 is clearly illustrated in Figure 9 of the drawings and indicated in general by the numeral 67. The said head comprises a body portion 68 of substantially rectangular form and provided at opposite edges with depending flanges 69 having spaced lateral extensions 70 formed with slots 71 in their relatively adjacent corners. These slots 71 slidably accommodate the lips 61 of the actuating bars 56 in the same manner that the lips 42 of the blades 38 are received within the slots 43 in the head 14. The head 67 is disposed above the plate 15 of the said head 14 and within the frame 16, being movable vertically in the frame under conditions to be presently explained. The body portion 68 of the head 67 is formed centrally with an opening 72 which is surrounded by an annular upstanding flange 73. The opening 23 in the top 18 of the frame 16 is surrounded by a depending flange 74, and a coil spring 75 is disposed between the under side of the said top 18 of the frame 16 and the upper side of the body portion 68 of the head 67 with its ends fitting over the flanges 73 and 74 as shown in Figures 2, 3 and 4 of the drawings, the spring yieldably holding the head 67 in a lowered position with its portions 70 resting upon the upper side of the plate 15. As the lips 61 are engaged in the slots 71, it will be evident that normally the actuating bars 56 for the bottom-forming and retaining members 48 will be maintained in a lowered position as shown in Figures 10 and 11 of the drawings, in which position the said members 48 will occupy a common plane with the respective plates 40, and the lower ends of the actuating bars 56 will project into the upper ends of the channels 62 thus securely locking the members 48 against any swinging movement about their hinges 55′. Attention is now called to the fact that if upward movement is imparted to the head 67 while the head 14 remains stationary, the actuating bars 56 will be slid upwardly in the channels 57 thus pulling upwardly upon the associated springs 63 until the heads 65 at the lower ends of these springs engage against the stops provided by the indents 66, continued upward movement of the head 67 and the bars 56 resulting in upward and inward swinging movement of the members 48, the lower ends of the bars 56 having been in the meantime retracted from engagement in the channels 62 so as to permit of such swinging movement of the said members 48. This operation is clearly illustrated in full and dotted lines in Figure 4 of the drawings.

The head 67 is actuated, to in turn actuate the bottom-forming and retaining members 48, through the rotation of the shaft 32 in a manner which will now be explained. The shaft 32 is a sleeve shaft and is rotatably fitted onto a spindle 76 which is fixedly mounted at its lower end, as at 77, upon the bearing plate 37. For a portion of its length immediately above its anchored lower end, the spindle 76 is formed larger in diameter than throughout the remainder of its length and this enlarged portion, which is indicated in general by the numeral 78, is provided with left hand threads indicated by the numeral 79, except that for a portion of its length at its lower end, the enlargement 78 is left unthreaded to provide a smooth cylindrical portion 80, a similar portion 81 being provided at the upper end of the said enlargement of the spindle. To accommodate the enlarged portion of the spindle, the lower end of the sleeve shaft 32 is formed with a cylindrical enlargement indicated by the numeral 82, and fixed to the lower end of this enlargement is a collar 83 the opening of which is interiorly threaded, as indicated by the numeral 84. The sleeve shaft 32 is capable of vertical movement under conditions to be presently explained, and when at the limit of its downward movement, the threaded collar 83 carried thereby will rest in frictional engagement at its under side, upon the upper sides of inturned friction fingers 85 which are formed upon a spring plate 86 mounted upon the bearing plate 37. Near its upper end the sleeve shaft 32 is provided with a squared portion 87 of cross sectional dimensions greater than the main portion of the shaft, and above the squared portion 87 the shaft is provided with another squared portion 88, or suitably formed in any other manner to provide for the connection to the shaft of the end of the flexible shaft 33. Between the squared portion 87 and the squared portion 88, the shaft is of normal diameter and provides a smooth cylindrical portion 89.

It is preferable that a scraping blade 90 be provided along the lower edge of the wall 3 of the casing 1 for a purpose to be presently described.

It will be customary to supply the various apparatuses in different sizes corresponding to the different sizes of cartons to be filled, and the apparatuses will be suspended by means of handles 91 and hooks 92 from a suitable frame 93 which may be suspended for travel upon a trolley 94 adapting it and the several apparatuses to be supported thereby to be moved back and forth over one or any number of ice cream cabinets from which the ice cream is to be dispensed, the motor 34 being also preferably suspended from this frame.

The operation of the apparatus is as follows:

Before the apparatus is set in operation the component parts thereof occupy the positions and relationship shown more particularly in Figs. 2 and 3 of the drawings. At such time the blades 38 and 39 are retracted to position within the casing of the apparatus. The flexible shaft 33 is connected with the squared upper end 88 of the shaft 32, and if the upper surface of the ice cream within the cabinet is uneven, the apparatus is drawn over said surface in a manner to scrape the surface with the blade 90 and thus level it. The bottom 8 of the casing is then disposed upon the leveled surface of the ice cream and the switch 35 is thrown so as to impart rotary motion to the shaft 32 toward the right or in a clockwise direction. The spring friction fingers 85 pressing upwardly against the threaded collar 83 serve to urge the shaft 32 in an upward direction so that the threads of this collar will engage with the threads 79 upon the fixed spindle 76, the upper end of the squared portion 87 of the shaft 32 being at such time connected with the gear 29 by engagement in a rectangular opening 95 formed in said gear. As the shaft 32 continues to rotate, rotary motion will be imparted to the gear 29 and through this gear to the gears 28 and to the threaded shafts 26. As these shafts are rotated, the threaded collars 24 will be fed downwardly therealong, correspondingly moving the head 14 and projecting the blades 38 and 39 downwardly through the throats 13. As the blades are projected, they will cut into the ice cream within the cabinet and the incisions made thereby will define a block of substantially frusto-pyramidal form. When the head 14 has reached substantially the limit of its lowering movement, adjacent edges of adjacent blades will be substantially in contact and the assemblage of blades will form a temporary container for the block of ice cream. In the meantime the threaded collar 83 has been fed upwardly along the threaded portion 79 of the enlargement 78 of the fixed spindle 76 so that the squared portion 87 of the shaft 32 has been gradually fed upwardly through the opening 95 until finally the lower end of the squared portion will clear the opening, and the shaft 32 will then rotate freely without effecting any further rotative movement of the threaded shafts 26.

As the shaft 32 continues to rotate, it will be further elevated with relation to the spindle 76, and the upper side of the collar 83 coming into engagement with the under side of the body portion 68 of the actuating head 67, this head will be elevated against the tension of the spring 75 as shown clearly in dotted lines in Figure 4 of the drawings. The head 14 at this time, however, remains stationary, in its lowered position. As the actuating head 67 is elevated in the manner stated, the operating bars 56 will be slid upwardly and the bottom-forming and retaining members 48 will be swung inwardly and upwardly, as indicated in Figure 4, sweeping through the ice cream beneath the formed block and finally assuming a horizontal position in a common plane and substantially closing the bottom of the casing. At this time the threaded collar 83 has left the upper end of the threads 79 and any further rotation of the shaft 32 merely effects a free rotation of the collar about the cylindrical portion 81 above said threads. The switch 35 is then thrown to stop the operation of the motor 34, and the apparatus is lifted from the cabinet, together with the block of ice cream which is contained within the temporary container formed by the blades 38 and 39. The apparatus is then disposed above the open carton in which the ice cream is to be dispensed, and the switch 35 is thrown so as to again set the motor in operation but this time in a reverse direction so as to impart rotative movement to the shaft 32 toward the left or in an anti-clockwise direction. The spring 75 exerting downward pressure upon the actuating head 67, and this head being in contact with the upper side of the threaded collar 83, the threads of the collar will be brought into engagement with the upper end of the threads 79 of the fixed spindle 76 and the collar will be fed downwardly upon the threaded portion of said spindle in the continued rotation of the shaft 32, thus effecting a lowering movement of the head 67 and through this movement, an outward and downward swinging movement of the bottom-forming and retaining members 48 until they assume their initial position shown in full lines in Figure 4 of the drawings.

In disposing the apparatus with relation to the carton, the temporary container provided by the blades 38 and 39 is bodily inserted into the carton and hence the lower ends of the extensions 47 of the blades 39 will rest upon the bottom of the said carton. These extensions are of a length but slightly greater than the height of the members 48 and will therefore serve to so limit the insertion of the temporary container into the carton that the lower edges of the members 48 will be clear of the bottom of the carton, when the members are swung downwardly and therefore there is no interference interposed or resistance offered to the swinging of these members to position to permit of the discharge of the block of ice cream from the said temporary container. At this time the lower end of the squared portion 87 of the shaft 32 has again engaged in the squared opening 95 in the gear 29, and upon continued rotation of the shaft 32 in the direction stated, the head 14 will be gradually elevated through the rotation of the threaded shafts 26, thus retracting the blades 38 and 39 and finally delivering the extracted molded block of ice cream into the dispensing carton. When the head 14 has reached the limit if its upward movement and the blades have been fully retracted, the shaft 32 will have been fed downwardly with relation to the spindle 76 a distance sufficient to permit the upper end of the squared portion 87 of the shaft to clear the squared opening 95 of the gear 29 and bring the cylindrical portion 89 of the shaft into position within the opening so that any further rotation of the shaft 32 will not effect any further movement of any of the parts of the mechanism and no damage can result if the motor is not immediately cut off.

It will be evident from the foregoing description of the invention that means is provided for extracting from a mass of ice cream or any other similar plastic or semi-plastic commodity to be dispensed, a block having a measured volume and a definite form and of uniform compactness throughout, the formation and extraction of this block and its final delivery into the dispensing carton being accomplished expeditiously and with but little labor on the part of the merchant and assuring both the merchant and the purchaser of the dispensed commodity that precisely the quantity of the commodity asked and paid for is dispensed.

While the apparatus herein illustrated and described is so constructed and operates in such a manner as to provide for the extraction of a block of ice cream or other commodity of frusto-pyramidal form, it will be understood that the apparatus might be readily modified so as to provide for the formation and extraction of blocks of various other contours. Also, as previously stated, the apparatus is capable of employment in dispensing commodities other than ice cream and similar delicacies and it is even possible that it might be put to use in measuring and dispensing substances or materials which do not possess the plastic state of the commodity mentioned. Also while certain details of structure have been illustrated and described, these details are susceptible of extensive modification without departing from the spirit of the invention.

Having thus described the invention, what is claimed as new is:

1. In apparatus for extracting measured quantities of a commodity from a mass of the same, a casing having a bottom plate adapted to rest upon the mass of the commodity, a plurality of blades mounted in the casing to be projected and extracted past the bottom plate, the blades when projected being adapted to penetrate the mass and enclose a portion thereof of definite form and volume, and means mounted in the casing including a reciprocating head carrying the blades to actuate the blades.

2. In apparatus for extracting measured quantities of a commodity from a mass of the same, a support, a plurality of blades mounted in the support to be projected and retracted and adapted when projected to penetrate the mass and enclose a portion thereof of definite form and volume and further adapted by their retraction to deliver such portion, and means associated with some of the blades and operated by projection of the blades to assume a supporting position below the portion of the mass enclosed by the blades and operated by retraction of the blades to assume a pendent position whereby the enclosed portion of the mass may be deposited in a container.

3. In apparatus for extracting measured quantities of a commodity from a mass of the same, a support, a plurality of blades mounted in the support to be projected and retracted and adapted when projected to penetrate the mass and enclose a portion thereof of definite form and volume and further adapted by their retraction to deliver such portions, extensions at the lower ends of some of the blades to engage the bottom of a container and support the blades in spaced relation thereto, and means associated with some of the blades and operated by projection of the same to support the portion of the mass enclosed by the blades and operated by the retraction of the blades to permit said portion of the mass to be deposited in the container.

4. In apparatus for extracting measured quantities of a commodity from a mass of the same, a support, a plurality of blades mounted in the support for projection and retraction and adapted when projected to penetrate the mass of the commodity and constitute a temporary container for a definite portion of the mass, and means mounted on the support for mechanically projecting and retracting the blades, the retraction of the blades permitting the extracted portion of the mass to be deposited in a dispensing container.

5. In apparatus for extracting measured quantities of a commodity from a mass of the same, a support, blades mounted in the support for projection and retraction in downwardly converging planes, a head mounted in the support and carrying the blades, means for reciprocating said head, bottom-forming members associated with some of the blades, an actuating member carried by the head and having limited movement relative thereto, and operative connections between said actuating member and the bottom-forming members whereby said bottom-forming members will be moved to operative position on projection of the blades and to inoperative position on retraction of the blades.

6. In apparatus for extracting measured quantities of a commodity from a mass of the same, a support, blades mounted in the support for projection and retraction in downwardly converging planes, a head mounted in the support and carrying the blades, means for reciprocating said head, a bottom-forming member hinged to the lower end of a blade, a bar slidably mounted on the blade, a head slidably mounted on the bottom-forming member in alinement with said bar, a resilient connection between said head and the bar, stops on the bottom-forming member above and in the path of said head, and an actuating member carried by the blade-carrying head and having limited movement relative thereto and operatively connected with said bar.

7. In apparatus for extracting measured qualities of a commodity from a mass of the same, a support, blades mountd in the support for projection and retraction in downwardly converging planes, a head within the support, means for reciprocating the head, and inwardly projecting lips at the upper ends of the blades slidably engaged with said head.

8. In apparatus for extracting measured quantities of a commodity from a mass of the same, a support, blades mounted thereon for projection and retraction, the blades being so relatively arranged that when projected they will be adapted to penetrate the mass and enclose a portion thereof of definite form and volume, means operable to project and retract said blades, and means associated with the blades and operable automatically through projection of the blades to extend across the bottom of the temporary container formed by the blades.

9. In apparatus for extracting measured quantities of a commodity from a mass of the same, a support, blades mounted thereon for projection and retraction, the blades being so relatively arranged that when projected they will be adapted to penetrate the mass and constitute a temporary container enclosing a portion of the mass of definite form and volume, means operable to project and retract said blades, and bottom-forming and retaining members associated with the blades and operable automatically through projection of the blades to extend across the bottom of the temporary container formed by the blades.

10. In apparatus for extracting measured quantities of a commodity from a mass of the same, a support, blades mounted thereon for projection and retraction, the blades being so relatively arranged that when projected they will be adapted to penetrate the mass and constitute a temporary container enclosing a portion of the mass of definite form and volume, means operable to project and retract said blades, bottom-forming and retaining members swingingly connected with opposite ones of said blades, and means for swinging said members inwardly and upwardly to form the bottom and retain the said portion of the mass of the commodity within the temporary container and to swing the said members downwardly and outwardly to clear the bottom prior to retraction of the said blades.

11. In apparatus for extracting measured quantities of a commodity from a mass of the same, a support, blades mounted thereon for projection and retraction, a head to which the blades are connected, the blades being so relatively arranged that when projected they will be adapted to penetrate the mass and enclose a portion thereof of definite form and volume, a rotatable shaft upon the support adapted to be motor-driven, and operative connection between the shaft and the said head for moving the head in a direction to project the blades when the shaft is rotated in one direction and for moving the head to retract the blades when the shaft is rotated in the opposite direction.

12. In apparatus for extracting measured quantities of a commodity from a mass of the same, a support, blades mounted thereon for projection and retraction, a head to which the blades are connected, the blades being so relatively arranged that when projected they will be adapted to penetrate the mass and enclose a portion thereof of definite form and volume, a rotatable shaft upon the support adapted to be motor-driven, operative connection between the shaft and the said head for moving the head in a direction to project the blades when the shaft is rotated in one direction and for moving the head to retract the blades when the shaft is rotated in the opposite direction, and means automatically rendering the connection between the shaft and head inactive when the head has reached either limit of its movement.

13. In apparatus for extracting measured quantities of a commodity from a mass of the same, a support, blades mounted thereon for projection and retraction, a head to which the blades are connected, the blades being so relatively arranged that when projected they will be adapted to penetrate the mass and enclose a portion thereof of definite form and volume, a rotatable shaft upon the support adapted to be motor-driven, a threaded shaft operatively engaging the head to move the same in a direction to project the blades when the shaft is rotated in one direction and to retract the blades when the shaft is rotated in the opposite direction, a gear upon the threaded shaft, a second gear meshing therewith, and means connecting the first mentioned shaft with the second mentioned gear to effect rotation of the second mentioned shaft and movement of the blade head, the said means being automatically rendered inactive to disconnect the said first-mentioned shaft from the second-mentioned gear when the head has reached either limit of its movement.

14. In apparatus for extracting measured quantities of a commodity from a mass of the same, a support, blades mounted thereon for projection and retraction and so relatively arranged that when projected they will be adapted to penetrate the mass and enclose a portion thereof of definite form and volume, a head to which the blades are connected, threaded shafts rotatably mounted upon the support and operatively connected with the head whereby to effect movement of the same when the shafts are rotated, gears upon the shafts, a driving gear meshing with the first mentioned gears, a drive shaft, the last-mentioned gear having a polygonal opening through which the drive shaft extends and the drive shaft having cylindrical portions of less diameter than said opening and a polygonal portion to engage in the polygonal opening in the gear whereby to connect the said last mentioned gear with the shaft for rotation, and means for automatically effecting longitudinal adjustment of the drive shaft in the rotation thereof whereby to move the polygonal portion of the drive shaft through the opening in the said last mentioned gear in such consonance with movement of the blade supporting head through rotation of the first mentioned shafts as to bring one or the other of the cylindrical portions of the drive shaft into the opening in the said last mentioned gear when the said head has reached either limit of its movement.

15. In apparatus for extracting measured quantities of a commodity from a mass of the same, a support, blades mounted thereon for projection and retraction and so relatively arranged that when projected they will be adapted to penetrate the mass and enclose a portion thereof of definite form and volume, a head to which the blades are connected, threaded shafts rotatably mounted upon the support and operatively connected with the head whereby to effect movement of the same when the shafts are rotated, gears upon the shafts, a driving gear meshing with the first mentioned gears, a drive shaft, the last mentioned gear having a polygonal opening through which the drive shaft extends and the drive shaft having cylindrical portions of less diameter than said opening and a polygonal portion to engage in the polygonal opening in the gear whereby to connect the said last mentioned gear with the shaft for rotation, and means for automatically effecting longitudinal adjustment of the drive shaft in the rotation thereof whereby to move the polygonal portion of the drive shaft through the opening in the said last mentioned gear in such consonance with movement of the blade supporting head through rotation of the first mentioned shafts as to bring one or the other of the cylindrical portions of the drive shaft into the opening in the said last mentioned gear when the said head has reached either limit of its movement, the said means comprising a fixed spindle about which the drive shaft is rotatable, the said spindle having a threaded portion, and threaded means upon the drive shaft for coaction with the threaded portion of the spindle.

16. In apparatus for extracting measured quantities of a commodity from a mass of the same, a support, blades mounted thereon for projection and retraction and so relatively arranged that when projected they will be adapted to penetrate the mass and enclose a portion thereof of definite form and volume, a head to which the blades are connected, threaded shafts rotatably mounted upon the support and operatively connected with the head whereby to effect movement of the same when the shafts are rotated, gears upon the shafts, a driving gear meshing with the first mentioned gears, a drive shaft, the last mentioned gear having a polygonal opening through which the drive shaft extends and the drive shaft having cylindrical portions of less diameter than said opening and a polygonal portion to engage in the polygonal opening in the gear whereby to connect the said last mentioned gear with the shaft for rotation, and means for automatically effecting longitudinal adjustment of the drive shaft in the rotation thereof whereby to move the polygonal portion of the drive shaft through the opening in the said last mentioned gear in such consonance with movement of the blade supporting head through rotation of the first mentioned shafts as to bring one or the other of the cylindrical portions of the drive shaft into the opening in the said last mentioned gear when the said head has reached either limit of its movement, the said means comprising a fixed spindle about which the drive shaft is rotatable, the said spindle having a threaded portion, and threaded means upon the drive shaft for coaction with the threaded portion of the spindle, the spindle having unthreaded portions at the ends of its threaded portion about which the said threaded means upon the drive shaft may freely rotate when the respective cylindrical portion of the drive shaft is within the opening in the last mentioned gear.

17. In apparatus for extracting measured quantities of a commodity from a mass of the same, a support, blades mounted thereon for projection and retraction and so relatively arranged that when projected they will be adapted to penetrate the mass and enclose a portion thereof of definite form and volume, a head to which the blades are connected, threaded shafts rotatably mounted upon the support and operatively connected with the head whereby to effect movement of the same when the shafts are rotated, gears upon the shafts, a driving gear meshing with the first mentioned gears, a drive shaft, the last mentioned gear having a polygonal opening through which the drive shaft extends and the drive shaft having cylindrical portions of less diameter than said opening and a polygonal portion to engage in the polygonal opening in the gear whereby to connect the said last mentioned gear with the shaft for rotation, and means for automatically effecting longitudinal adjustment of the drive shaft in the rotation thereof whereby to move the polygonal portion of the drive shaft through the opening in the said last mentioned gear in such consonance with movement of the blade supporting head through rotation of the first mentioned shafts as to bring one or the other of the cylindrical portions of the drive shaft into the opening in the said last mentioned gear when the said head has reached either limit of its movement, the said means comprising a fixed spindle about which the drive shaft is rotatable, the said spindle having a threaded portion, and threaded means upon the drive shaft for coaction with the threaded portion of the spindle, the spindle having unthreaded portions at the ends of its threaded portion about which the said threaded means upon the drive shaft may freely rotate when the respective cylindrical portion of the drive shaft is within the opening in the last mentioned gear, and means yieldably acting against the said drive shaft to effect engagement of the threaded member thereof with the threads of the spindle upon reversal of the direction of rotation of the said drive shaft.

18. In apparatus for extracting measured quantities of a commodity from a mass of the same, a support, blades mounted thereon for projection and retraction, the blades being so relatively arranged that when projected they will be adapted to penetrate the mass and enclose a portion thereof of definite form and volume, a head to which the blades are connected, a bottom-forming and retaining member swingingly connected with the entering portion of one of the blades, an actuating member movable with relation to the said head, means for effecting movement of the said head to project and retract the blades, and means for effecting movement of the actuating member with relation to the head, in the projected position of the blades, to cause the bottom-forming and retaining member to extend across the bottom of the temporary container formed by the blades.

19. In apparatus for extracting measured quantities of a commodity from a mass of the same, a support, blades mounted thereon for projection and retraction, the blades being so relatively arranged that when projected they will be adapted to penetrate the mass and enclose a portion thereof of definite form and volume, a head to which the blades are connected, a bottom-forming and retaining member swingingly connected with the entering portion of one of the blades, an actuating member movable with relation to the said head, means for effecting movement of the said head to project and retract the blades, and means for effecting movement of the actuating member with relation to the head, in the projected position of the blades, to cause the bottom-forming and retaining member to extend across the bottom of the temporary container formed by the blades, the said means being also operable to effect movement of the actuating member to cause the bottom-forming and retaining member to clear the bottom of the said temporary container upon retraction of the blades.

20. In apparatus for extracting measured quantities of a commodity from a mass of the same, a support, blades mounted thereon for projection and retraction, the blades being so relatively arranged that when projected they will be adapted to penetrate the mass and enclose a portion thereof of definite form and volume, a head to which the blades are connected, a bottom-forming and retaining member swingingly connected with the entering portion of one of the blades, an actuating member movable with relation to the said head, means for effecting movement of the said head to project and retract the blades, and means for effecting movement of the actuating member with relation to the head, in the projected position of the blades, to cause the bottom-forming and retaining member to extend across the bottom of the temporary container formed by the blades, the said means comprising an actuating bar slidably mounted upon the blade which carries the bottom-forming and retaining member, and operative connections between said bar and the said bottom-forming and retaining member and between the bar and the said actuating member.

21. In apparatus for extracting measured quantities of a commodity from a mass of the same, a support, blades mounted thereon for projection and retraction, the blades being so relatively arranged that when projected they will be adapted to penetrate the mass and enclose a portion thereof of definite form and volume, a head to which the blades are connected, a bottom-forming and retaining member swingingly connected with the entering portion of one of the blades, an actuating member movable with relation to the said head, means for effecting movement of the said head to project and retract the blades, and means for effecting movement of the actuating member with relation to the head, in the projected position of the blades, to cause the bottom-forming and retaining member to extend across the bottom of the temporary container formed by the blades, the said means being also operable to effect movement of the actuating member to cause the bottom-forming and retaining member to clear the bottom of the said temporary container upon retraction of the blades, the said means comprising an actuating bar slidably mounted upon the blade which carries the bottom-forming and retaining member, and operative connections between said bar and the said bottom-forming and retaining member and between the bar and the said actuating member, and means for automatically locking the bottom-forming and retaining member in a plane with the respective blade when moved to position within said plane.

22. In apparatus for extracting measured quantities of a commodity from a mass of the same, a support, a plurality of members mounted upon the support, opposite ones of the members being guided for projective and retractive movement in planes inclined toward each other, the members in their projected position coacting to constitute a temporary container enclosing a portion of the mass of the commodity of definite form and volume, and means for actuating the said members to penetrate the mass and for actuating the said members to withdraw from the said extracted portion of the mass.

23. In apparatus for extracting measured quantities of a commodity from a mass of the same, a support, a plurality of members mounted upon the support, opposite ones of the members being guided for projective and retractive movement in planes inclined toward each other, the members in their projected position coacting to constitute a temporary container enclosing a portion of the mass of the commodity of definite form and volume, means for actuating the said members to penetrate the mass and for actuating the said members to withdraw from the said extracted portion of the mass, and bottom-forming and retaining members swingingly connected with the lower ends of opposite ones of the penetrating members and operable antomatically upon projection of the said penetrating members to move to position to extend across the bottom of the temporary container afforded by the assemblage of penetrating members and to clear said bottom upon retraction of said penetrating members.

In testimony whereof I affix my signature.

HERBERT W. LUSTIG.